(12) United States Patent
Chaoji et al.

(10) Patent No.: US 10,394,913 B1
(45) Date of Patent: Aug. 27, 2019

(54) DISTRIBUTED GROUPING OF LARGE-SCALE DATA SETS

(71) Applicant: Amazon Technologies, Inc., Seattle, WA (US)

(72) Inventors: Vineet Shashikant Chaoji, Bangalore (IN); Sivaramakrishnan Kaveri, Bangalore (IN); Vineet Khare, Redmond, WA (US); Gourav Roy, Bangalore (IN); Saurabh Sohoney, Bangalore (IN); Andrew Dennis Willingham, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 455 days.

(21) Appl. No.: 15/210,841

(22) Filed: Jul. 14, 2016

(51) Int. Cl.
| | |
|---|---|
| *G06F 16/00* | (2019.01) |
| *G06F 16/9535* | (2019.01) |
| *G06F 7/24* | (2006.01) |
| *G06F 17/16* | (2006.01) |
| *G06F 17/18* | (2006.01) |
| *G06F 16/2457* | (2019.01) |

(52) U.S. Cl.
CPC .......... *G06F 16/9535* (2019.01); *G06F 7/24* (2013.01); *G06F 16/24575* (2019.01); *G06F 17/16* (2013.01); *G06F 17/18* (2013.01)

(58) Field of Classification Search
CPC .... G06F 17/16; G06F 17/30867; G06F 17/18; G06F 17/30528; G06F 7/24; G06F 16/9535; G06F 16/24575
See application file for complete search history.

(56) References Cited

U.S. PATENT DOCUMENTS

| | | | |
|---|---|---|---|
| 8,805,845 B1 | 8/2014 | Li et al. | |
| 8,966,036 B1* | 2/2015 | Asgekar | G06Q 50/01 707/706 |
| 9,286,391 B1 | 3/2016 | Dykstra et al. | |
| 9,477,758 B1 | 10/2016 | Tong et al. | |
| 10,157,224 B2 | 12/2018 | Kazi et al. | |
| 2003/0074369 A1* | 4/2003 | Schuetze | G06F 16/355 |
| 2009/0210406 A1* | 8/2009 | Freire | G06F 16/35 |
| 2012/0163715 A1* | 6/2012 | Murray | G06K 9/4652 382/167 |
| 2014/0019240 A1 | 1/2014 | Zhou | |
| 2014/0280241 A1 | 9/2014 | Reblitz-Richardso et al. | |
| 2014/0297740 A1 | 10/2014 | Narayanan et al. | |
| 2016/0188713 A1 | 6/2016 | Green | |

(Continued)

*Primary Examiner* — Leslie Wong
(74) *Attorney, Agent, or Firm* — Knobbe, Martens, Olson & Bear, LLP

(57) ABSTRACT

Features are provided for the analysis of collections of data and automatic grouping of data having certain similarities. A collection of data regarding user interactions with item-specific content can be analyzed. The analysis can be used to identify groups of items that are of interest to groups of similar users and/or to identify groups of users with demonstrated interests in groups of similar items. Data may be analyzed in a "bottom-up" manner in which correlations within the data are discovered in an iterative manner, or in a "top-down" manner in which desired top-level groups are specified at the beginning of the process. A bottom-up process may also be distributed among multiple devices or processors to more efficiently discover groups when using large collections of data.

20 Claims, 8 Drawing Sheets

(56) References Cited

U.S. PATENT DOCUMENTS

| | | |
|---|---|---|
| 2016/0188725 A1 | 6/2016 | Wang et al. |
| 2016/0246896 A1 | 8/2016 | Arora et al. |
| 2017/0053336 A1 | 2/2017 | Barbour et al. |
| 2017/0083507 A1* | 3/2017 | Ho .................. G06F 16/9535 |
| 2017/0199927 A1 | 7/2017 | Moore et al. |
| 2018/0165554 A1 | 6/2018 | Zhang et al. |

* cited by examiner

DISTRIBUTED GROUPING OF LARGE-SCALE DATA SETS

BACKGROUND

Generally described, computing devices and communication networks can be utilized to exchange content and other information. In a common application, a computing device can request content from other computing devices via a communication network. For example, a computing device, also referred to as a user computing device or client computing device, may be used by a user to request content, such as text, documents, audio recordings, video, images, animations, and the like. The content request may be transmitted to another computing device, such as a content server or another user computing device that processes the request and provides the requested content or information regarding the request.

In some scenarios, a content server may distribute content to a user computing device as a set of multiple content posts in which a user of the user computing device may be interested. The set of content posts, also referred to as a "feed," may be selected from a larger set of available content posts based on the degree to which individual content posts correspond to the interests of the user. For example, a user of a social media system may be presented with a feed of content posts that match the user's interests, as determined from the user's demographic characteristics, interactions with the social media system, and the like. As another example, a user of a news service may be presented with a feed of articles based on the user's stated interests, interactions with other content provided by the news service, etc.

From the perspective of a user receiving a content feed, a user experience may be defined in terms of the degree to which content in the feed is of interest to the user. In an effort to provide the most relevant content, systems use various techniques to analyze and select, from a large set of available content, a subset of content that is relevant to a user's interests.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
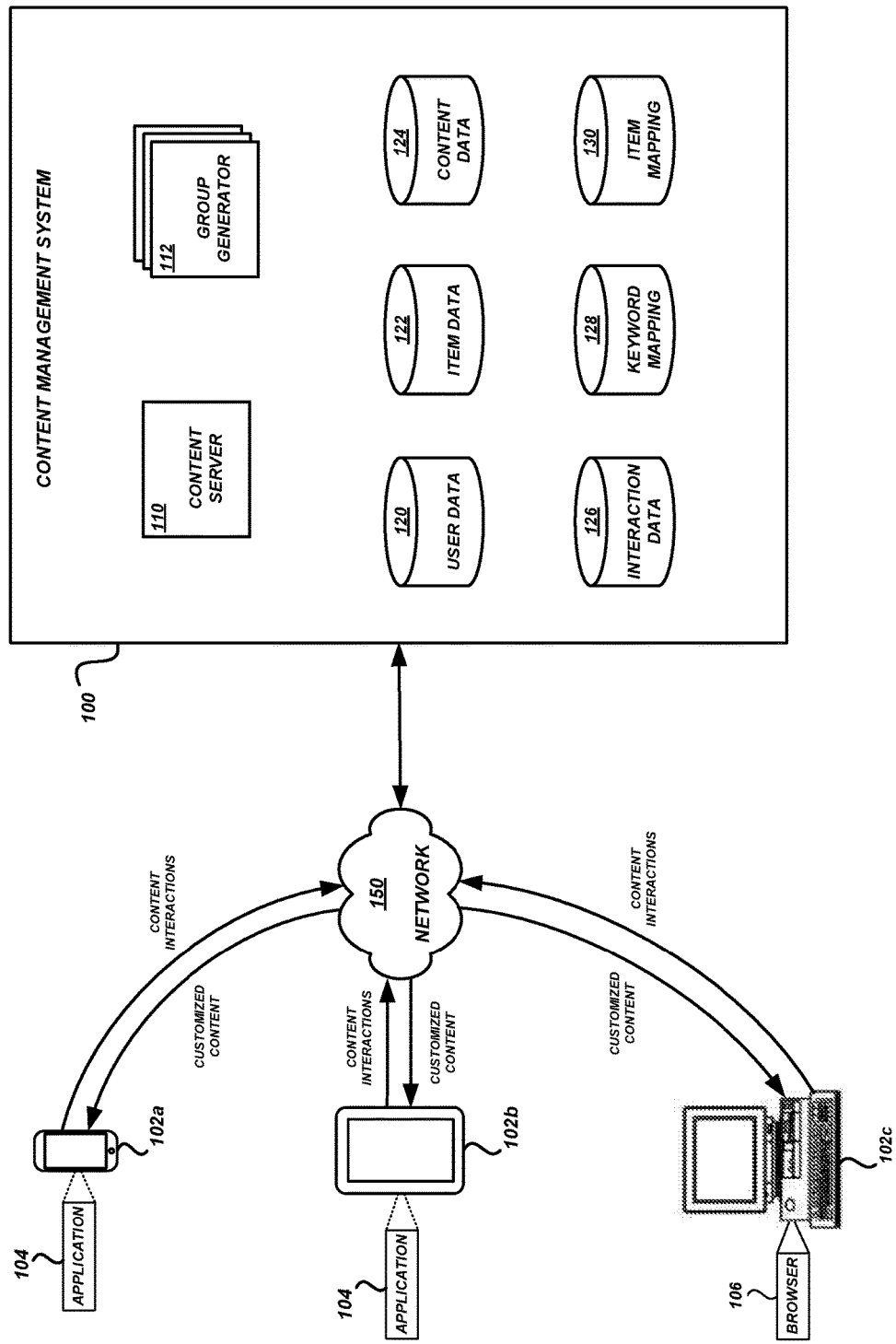
FIG. 1 is a block diagram of an illustrative computing environment including a content management system and various user devices according to some embodiments.

The present disclosure is directed to scalable systems that analyze collections of data and automatically generate groups of data having certain similarities. A large collection of data (e.g., a collection with millions of data points) regarding user interactions with item-specific content can be analyzed. The analysis can be used to identify groups of items that are of interest to groups of similar users, and/or to identify groups of users with demonstrated interests in groups of similar items. The collection of data may be analyzed in a "bottom-up" manner in which correlations within the data are discovered in an iterative process, and then groups are generated from the discovered correlations. The collection of data many also or alternatively be analyzed in a "top-down" manner in which desired top-level groups are specified at the beginning of the process, and various correlations observed within the data are leveraged to place items and/or users into the specified groups. In some cases, a top-down analysis may be combined with a bottom-up analysis by, e.g., using a top-down analysis to determine a set of initial groups, and a bottom-up analysis to discover more granular groups or more accurate groups from the pre-grouped data. The bottom-up process may also be distributed among multiple devices or processors to more efficiently discover groups when analyzing large collections of data with certain properties.

Some aspects of the present disclosure relate to the bottom-up analysis of data using "clustering" methods optimized for use with large data collections. Clustering is the task of grouping a set of objects (e.g., items, users, etc.) such that objects in the same group or "cluster" are more similar to each other than to objects in other clusters. Some conventional clustering methods are inefficient or break down when used on extremely large data collections, or on data having certain properties. For example, if the data to be analyzed represents the interactions of millions of users with content regarding hundreds of thousands of different items, then a separate n-dimensional array or "vector" may be generated for each individual item (where n is the number of users). Each of the n elements in one of the n-dimensional vectors can include data representing the interactions of a single user with content regarding a single item. Because each item tends to be of interest to only a small percentage of the users, the item-specific vectors tend to be "sparse" vectors having values of zero or approaching zero for most of the n elements, indicating that most users have not interacted with content regarding the item. Conventional methods of clustering may not perform well when used with data that is so high-dimensional (e.g., data represented as vectors having millions of dimensions in this example) and/or data that is so sparse (e.g., a significant majority of individual values in each vector are zero or approaching zero in this example).

To overcome some limitations of conventional clustering, a modified version of k-means clustering may be used. In k-means clustering, data is represented as a collection of data points in multi-dimensional space, and the data points that are close to each other within the multi-dimensional space are identified as clusters. In some embodiments, rather than using the Euclidean distance to determine how far a particular data point is from the center of each cluster, as is typically done in conventional k-means clustering, an alternative distance that provides better results with sparse vectors may be used. For example, the cosine distance between data points and cluster centers may be used. In some embodiments, the clustering may be distributed over multiple processors. For example, when the data being clustered is too large to fit within the memory space of a single processor, the data can be partitioned and distributed to multiple processors, along with a copy of the data representing the centers or "centroids" of the clusters. The separate processors can then process their partitions separately and update their own copies of the centroids. The centroids may be aggregated and synchronized across the multiple processors for subsequent iterations as needed. In some embodiments, the data being clustered may be represented by a compact probabilistic data structure (e.g., a count sketch) to reduce the size of the data and enhance distributed processing. For example, a separate count sketch or other probabilistic data structure may be maintained for each cluster. In comparison with the full data collection, such probabilistic data structures can require a small fraction of the space to store, bandwidth to transmit, etc.

Additional aspects of the disclosure relate to the top-down analysis of data based on similarities in users' search queries and content browsing sessions. In a top-down analysis, a set of groups can be initially specified as groups of objects being associated with particular keywords (e.g., items purchased after performing searching using the keywords). In some embodiments, a map of specific search term keywords to other similar search term keywords (e.g., search term keywords used in the same content browsing session) can be used to expand the coverage of the predetermined groups. A map of keywords to the items ultimately purchased after performing keyword searches may then be used to identify the items that correspond to the predetermined groups. In some embodiments, information regarding the content browsing sessions of users may be used to further expand the coverage of the predetermined groups. For example, a graph of items may be generated in which connections between individual items indicate a relationship between the connected items (e.g., content regarding the items was browsed during the same browsing session, the items were purchased by the same user, etc.). The graph can be analyzed to identify related items that may be grouped together.

Further aspects of the present disclosure relate to the use of a top-down analysis together with a bottom-up analysis. In some embodiments, a top-down analysis may be used to generate initial groups from a data set before performing a bottom-up analysis, such as clustering. When a bottom-up clustering process is performed, an initial set of cluster centroids is typically determined and then iteratively updated until a final clustering of objects is reached. By using a top-down analysis in place of the first clustering iteration to determine the initial clusters or cluster centroids, the bottom-up approach may be given a significant "head start" over alternative methods, such as random initialization of the initial clusters centroids. In some embodiments, a bottom-up analysis may be used prior to performing a top-down analysis. For example, k-means clustering may be performed on a data set to generate the initial groups for the top-down analysis. The initial groups can then be expanded during the top-down analysis through the use of keyword map analysis, item graph analysis, etc.

Although aspects of some embodiments described in the disclosure will focus, for the purpose of illustration, on particular examples of computing devices and content interactions, the examples are illustrative only and are not intended to be limiting. In some embodiments, the techniques described herein may be applied to additional or alternative content, algorithms, or computing devices. Various aspects of the disclosure will now be described with regard to certain examples and embodiments, which are intended to illustrate but not limit the disclosure.

Network-Based Content Interaction Environment

With reference to an illustrative embodiment, FIG. 1 shows a network environment in which aspects of the present disclosure may be implemented. As shown, the network environment may include a content management system 100 and various user devices 102*a*, 102*b*, and 102*c* (collectively "user devices 102"). The user devices 102 and content management system 100 may communicate with each other via one or more communication networks 150. A communication network 150 may be a publicly accessible network of linked networks, possibly operated by various distinct parties, such as the Internet. In other embodiments, the network 150 may include a private network, personal area network, local area network, wide area network, cable network, satellite network, cellular telephone network, etc. or a combination thereof, some or all of which may or may not have access to and/or from the Internet.

The content management system 100 may include various components for providing the features described herein. Illustratively, the content management system 100 may include a content server 110 configured to provide content to user devices 102 and process user interactions with the content. The content management system 100 may also include any number of group generators 112 to analyze data and generate groups of users, items, etc.

The content management system 100 may also include various data stores to store data and/or files in connection with group determination and customized content generation. For example, the content management system 100 may include a user data store 120 to store data about individual users, including information regarding interests, demographic characteristics, groups to which the users have been assigned, etc. The content management system 100 may also include an item data store 122 to store data about individual items, including information regarding characteristics of the items, content associated with the items, groups to which the items have been assigned, etc. The content management system 100 may also include a content data store 124 to store the corpus of content (or information about the content) available to be distributed to user devices. The content management system 100 may also include an interaction data store 126 to store information about the various interactions that users have performed with content, such as requests for content, purchases of items referenced in the content, etc. The content management system 100 may also include a keyword mapping data store 128 to store information about the relationships between various keywords used in search queries, keywords associated with content and/or items, etc. The content management system 100 may also include an item mapping data store 130 to store information the relationships between various items and keywords (e.g., items purchased, or item-specific content being requested or viewed, by a user during a same browsing session as a search query with particular keywords is submitted by the user). The data stores and other components of the content management system 100 shown in FIG. 1 and described herein are illustrative only, and are not intended to be limiting. In some embodiments, fewer, additional, and/or alternative data stores and/or components may be implemented by a content management system 100.

The content management system 100 may be implemented on one or more physical server computing devices that provide computing services and resources to users. In some embodiments, the content management system 100 (or individual components thereof, such as the content server 110, group generator 112, etc.) may be implemented on one or more host devices, such as blade servers, midrange computing devices, mainframe computers, desktop computers, or any other computing device configured to provide computing services and resources. For example, a single host device may execute one or more content servers 110, one or more group generators 112, various data stores, some combination thereof, etc. The content management system 100 may include any number of such hosts.

In some embodiments, the features and services provided by the content management system 100 may be implemented as web services consumable via the communication network 150. In further embodiments, the content management system 100 (or individual components thereof) is provided by one more virtual machines implemented in a hosted computing environment. The hosted computing environment may include one or more rapidly provisioned and released computing resources, such as computing devices, networking devices, and/or storage devices. A hosted computing environment may also be referred to as a cloud computing environment.

The individual user devices 102 may be any of a wide variety of computing devices, including personal computing devices, terminal computing devices, laptop computing devices, tablet computing devices, electronic reader devices, wearable computing devices, mobile devices (e.g., smart phones, media players, handheld gaming devices, etc.), and various other electronic devices and appliances. A user may operate a user device 102 to access and interact with content managed by the content management system 100. In some embodiments, a user may launch specialized application software, such as a mobile application 104 executing on a particular user device, such as a smart phone 102a or tablet computer 102b. The application 104 may be specifically designed to interface with the content management system 100 for accessing and interacting with content. In some embodiments, a user may use other application software, such as a browser application 106, to interact with the content management system 100.

When a user accesses an application 104 on a user device 102a to retrieve content, the user device 102a may establish a connection with the content management system 100 via the network 150. The user device 102a may receive content from a content server 110 of the content management system 100 via the connection. The content may include network resources such as Web pages, content posts, documents, images, videos, and the like. Illustratively, the content may be received as an individual piece of content (an individual Web page) or as a "feed" of multiple pieces of content (e.g., a continuous stream of content posts). A user of the user device 102a can interact with the content by activating links to other content, submitting search queries, initiating the purchase of items referenced in the content, etc. Information regarding user interactions with the content can be transmitted to the content management system 100 for processing by a content server 110. In addition, information regarding the interactions, or some subset thereof, may be stored for use in determining groups of similar items and/or users. For example, information regarding interactions may be stored in the interaction data store 126.

A group generator 112 may use interaction data to determine groups of items referenced in content and/or users that have interacted with the content. For example, as described in greater detail below, a group generator 112 may analyze the interaction data to identify groups of items that tend to be of interest to groups of similar users. As another example, the group generator 112 may analyze the interaction data to identify groups of users that tend to interact with content regarding groups of similar content items.

The groups generated by the group generator 112 can be used to customize content that is provided the users. For example, when a user requests content from or otherwise establishes a connection to a content server 110, the content server 110 can obtain information regarding the group or groups with which the user is associated. The content server 110 can then obtain information regarding particular items that are also associated with the same groups, and the content server 110 can customize the content that is provided to the user based on the items. Illustratively, the content server 110 may emphasize content regarding the identified items in the content that is provided to the user by including recommendations for items, recommendations for content regarding the items, etc.

Example Process for Clustering Sparse High-Dimensional Data

Figure 2:
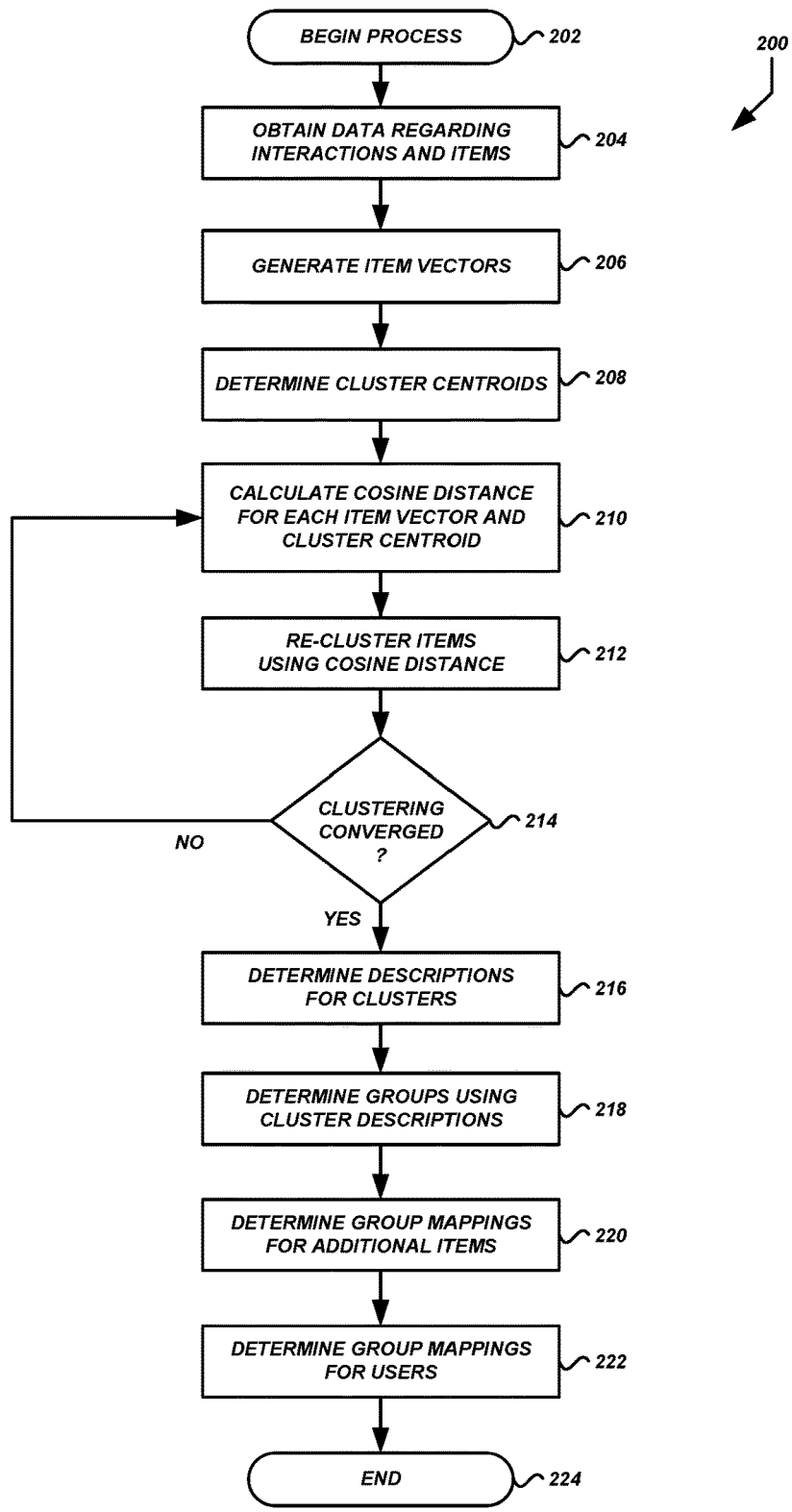
FIG. 2 is a flow diagram of an illustrative process for grouping items and users according to some embodiments.

FIG. 2 is a flow diagram of an illustrative process 200 that may be executed by a group generator 112 or some other module or component of the content management system 100 to cluster content interaction data and generate groups of items and/or users. Advantageously, the process 200 may be used to cluster sparse, high-dimensional data, such as n-dimensional vectors for each of a large number of different items, where n=the total number of users whose content interactions are represented in the vectors. For example, a content management system 100 that manages content regarding millions of different items, accessed by millions of different users, may use the process 200 to determine groups of similar items and/or users in order to customize content served to the users. The process 200 can use data regarding user interactions with item-specific content to cluster the items because the items are being clustered for use in customizing content for the users. Thus, it is appropriate that the clustering process itself be driven by the user interactions that are to be enhanced by the result of the clustering process.

The process 200 shown in FIG. 2 begins at block 202. The process 200 may begin in response to an event, such as when execution of a content generator 112 begins, when initiated by a system administrator, etc. When the process 200 is initiated, a set of executable program instructions stored on one or more non-transitory computer-readable media (e.g., hard drive, flash memory, removable media, etc.) may be loaded into memory (e.g., random access memory or "RAM") of a computing device of the content management system 100. The executable instructions may then be executed by a hardware-based computer processor (e.g., a central processing unit or "CPU") of the computing device. In some embodiments, the process 200 or portions thereof may be implemented on multiple processors, serially or in parallel.

At block 204, the group generator 112 or some other module or component of the content management system 100 can obtain data regarding user interactions with item-specific content, and other data regarding the items to be clustered. The data may be obtained from the user data store 120, the item data store 122, the user interactions data store 126, and/or from some other data source. The data regarding interactions and items is used at block 206, below, to generate vectors for each item. In some implementations, there may be hundreds of thousands—or even millions—of different items tracked by the content management system 100. In order to reduce the volume of vectors that are generated, analyzed, and clustered, the information regarding some items may be aggregated. For example, not all items may be truly different items. Some items may come in different colors and/or sizes, and are really different versions of the same item. These different versions may be treated as a single item for clustering purposes, and the user interaction data regarding the individual versions may be aggregated and treated as user interaction data for the single item. As another example, some items may not be different versions of a single item, but may nevertheless be closely related (e.g., interchangeable models of a product manufactured by different companies or offered under different brand names) and may also be aggregated. In some embodiments, the determination of whether to treat multiple items as a single aggregated item for clustering purposes may be based on the amount of user interaction data available. If at least a threshold level of user interaction data is available for multiple items that may otherwise be treated as a single aggregated item, then the items may be treated as separate items. If a threshold level of user interaction data is not available for individual items that may be treated as separate items, then the items may be aggregated where practical and treated as a single aggregated item.

As described in greater detail below, each item-specific vector can have n dimensions to store data regarding the interactions of n different users with content regarding the item. The content management system 100 may have millions, or tens of millions, or more different users for which interaction data has been stored. In order keep the user data representative of a desired sample of users and to keep the vectors to a manageable size, a subset of users may be selected. For example, of the tens of millions of users of a particular content management system 100, the users with the largest number of content interactions (which may be institutional users such as resellers, rather than individual users for whom it is desired to customize content) may be ignored. As another example, the users with the smallest number of content interactions (which may be passive or inactive users) may also be ignored. Illustratively, only users in the middle p percentile may be included (where p is a positive number), or only users with a number of content interactions between an upper and lower threshold may be included. In some embodiments, item-specific vectors may other information regarding the item instead of, or in addition to, data regarding customer interactions with item-specific content. For example, one or more dimensions of an item-specific vector may include data regarding an attribute of the item, a textual description of the item, a review of the item, etc.

At block 206, the group generator 112 or some other module or component of the content management system 100 can generate item-specific vectors, also referred to simply as data vectors or vectors, from the data obtained above at block 204. The vectors may each have n dimensions, wherein n is the number of users whose content interaction data is stored in the vectors. The content interaction data stored at any particular dimension, corresponding to a particular user, may be a number representative the user's total interactions with content regarding the item for which the vector is generated. For example, if a user browsed 10 pieces of content related to the item and also purchased the item, the value stored in user's corresponding element of the vector may be 11, representing the sum of 10 pieces of content browsed and 1 purchase made. In some embodiments, the content interactions may be weighted differently, such that some content interactions contribute more to the value stored in the user's corresponding element. For example, purchases may be weighted 10 times more than content browsing interactions. Thus, a value of 20 may be stored for a user with 10 content browsing interactions and 1 item purchase. In some embodiments, the value stored in each element may be a flag indicating whether or not the user has any interaction with content associated with the item, or whether the user has a threshold number of interactions (e.g., 1 if the user has any content interactions, 0 if no interactions).

The individual vectors may be normalized to streamline the clustering computations described in greater detail below. In some embodiments, the vectors can be normalized to unit vectors (vectors having Euclidian lengths of 1) using L2 normalization. Illustratively, L2 normalization of a vector x to obtain a unit vector v may be performed by dividing each element of the vector x by the L2 norm of the vector x (dividing by the square root of the sum of squared elemental values of x).

At block 208, the group generator 112 or some other module or component of the content management system 100 can generate the initial cluster centroids. A centroid may be represented by a vector of the same size as the vectors being clustered (e.g., an n-dimensional vector in this example) where the value of each element in the centroid vector is typically the mean of the values of the corresponding elements in all vectors in the cluster. In some embodiments, a top-down analysis such as the process shown in FIG. 6 and described in greater detail below is used to generate the initial clusters. In such cases, the centroid for each cluster can be computed from the vectors in the initial clusters. In some embodiments, there may not be any initial generation of clusters. In such cases, a random vector may be selected as the centroid of each cluster. For example, it may be determined that 10 clusters are to be generated from the vectors generated above at block 204. Thus, 10 random vectors from the vectors generated above may be selected as the initial centroids for the clustering process 200. As another example, 10 random vectors may be generated by using a random number generator to assign random values to the n individual elements of 10 different vectors. The example methods of generating initial cluster centroids are illustrative only, and are not intended to be limiting. In some embodiments, other methods may be used.

At block 210, the group generator 112 or some other module or component of the content management system 100 can compute the distance of each vector, determined at block 206, from each cluster centroid, determined above at block 208. Illustratively, the group generator 112 may compute the cosine distance of each normalized vector $v_i$ from the centroid $c_h$ of the $h^{th}$ cluster using equation [1] below:

$$\text{cosine\_distance}(x_i, c_h) = 1 - \sum_{r=1}^{s} v_{ir} z_{hr} \quad [1]$$

where $z_{hr}$ is the normalized cluster centroid of the $h^{th}$ cluster.

At block 212, the group generator 112 or some other module or component of the content management system 100 can assign each individual vector to a cluster based on the distance computed above at block 210. For example, for each individual vector, the group generator 112 may determine the cluster centroid having the smallest cosine distance from the vector. The group generator 112 may then each vector to the cluster with the smallest cosine distance from the vector. Once each vector has been assigned to the closest respective centroid, the centroids for each cluster can be re-computed as the mean vector of all vectors assigned to the cluster. In some embodiments, individual vectors may be assigned to the closest cluster and the centroids may be re-computed after reassignment of each vector, rather than after assignment of all vectors. For example, a cosine distance may be computed for a single vector with respect to each cluster centroid, as described above. The vector may then be assigned to the cluster represented by the centroid closest to the vector, and any affected centroids may be re-computed before determining the cosine distance for the next vector.

At decision block 214, the group generator 112 or some other module or component of the content management system 100 can determine whether the clustering process has "converged," or reached a final assignment of all vectors to their corresponding closest centroids. If so, the process 200 may proceed to block 216. Otherwise, the process may return to block 210. The determination that the clustering process has converged may be made if no vectors, or a number of vectors below a threshold, have been reassigned to different clusters during the most recent iteration of block 212 above. In some embodiments, the group generator 112 may determine to proceed to block 216 after a predetermined or dynamically determined number of iterations of blocks 210 and 212. For example, it may be empirically determined that a particular number of iterations may provide acceptable results. As another example, there may be a certain computational cost associated with each iteration. The clustering process may be stopped once the overall computational cost of all iterations exceeds some threshold, once the computational cost of performing another iteration exceeds the expected benefit of another iteration, etc.

At block 216, the group generator 112 or some other module or component of the content management system 100 can determine textual descriptor for the clusters generated above. The individual items whose corresponding vectors have been clustered may each have names or textual descriptions with which they are associated. In addition, each item's vector has a corresponding score that is indicative of how "close" the vector is the cluster centroid. The group generator 112 can select keywords from the names and textual descriptions of items closest to each cluster centroid. The keywords selected for individual clusters can serve as a "bag-of-words" textual descriptor for the corresponding clusters. In some embodiments, the group generator 112 can start with the items closest to the cluster centroids, and may continue adding words to the bag-of-words from items farther from the cluster centroids until the words to be added begin to differ significantly from words added to the bag-of-words from items closer to the cluster centroids. The point at which the keywords begin to differ significantly from keywords obtained from items closer to the cluster centroids may be determined using textual similarity metrics, such as those based on various distance metrics.

At block 218, the group generator 112 or some other module or component of the content management system 100 can select the group, from a set of predetermined groups with corresponding descriptions, to which individual clusters will be assigned. The specific cluster-to-group assignments can be determined using textual similarity metrics, such as those based on various distance metrics. Clusters may be assigned to groups on a one-to-one or many-to-one basis, depending upon the group to which each cluster is determined to be most similar based on textual descriptions. In some cases, multiple clusters may be assigned to a single group depending upon the number of groups, the broadness of their corresponding descriptions, etc. For example, two different clusters, one having baby toys and one having baby clothes, may both be assigned to a broader baby products group). In some embodiments, a set of predetermined groups and corresponding descriptions is not used. Instead, the textual descriptions determined above in block 214 may be used for the various clusters.

At block 220, individual items that were not included in the clustering described above can be mapped to groups from the set of predetermined groups to which the clusters have been assigned. For example, new items, items which did not have sufficient user interactions, and other items that were left out of the clustering process may be assigned to groups. In some embodiments, vectors may be generated, as described above with respect to block 206, for the items to be added to groups. The vectors may be compared to the most recently determined cluster centroids, and the items may be assigned to the group to which the closest cluster centroid belongs. In some embodiments, items must be within a threshold distance of a cluster centroid in order to be added to a group to which the cluster belongs, and items not sufficiently close to any cluster centroid may be left ungrouped.

At block 222, users can be mapped to groups from the set of predetermined groups (or to generated clusters if no predetermined groups are used). As described above, items are clustered into groups by using item-specific vectors in which each individual dimension of the vectors has a value representing the interactions of a single user with content regarding the item. To assign the users to the groups (or clusters), a similar process may be used in which user-specific k-dimensional vectors are generated for each user, where k is the number of available groups. Each individual dimension of the vectors has a value representing the user's interactions with items in a particular group. Using these user-specific vectors, various conditional probabilities may be computed regarding the probability that a user is in a particular group (e.g., assuming all users could be properly assigned to a specific groups). In some embodiments, given a particular user i, the probability that the user should be assigned to group k based on the user's specific vector $N_i$ may be computed using equation [2] below:

$$p(\text{group}=k|\text{user}=i)=(Y_i^k)/\Sigma_k(Y_i^k)$$

$$\text{where,} Y_i^k=(N_i^k)/\Sigma_k(N_i^k) \quad [2]$$

The probability computed using equation [2] above may be useful when customizing content for the user. For example, a content server 110 may customize content by recommending a particular group that may be of interest to the user. The content server 110 can choose the group with the highest probability as computed using equation [2], the subset of groups with probabilities over a threshold, etc.

In some embodiments, given a particular group k, the likelihood that a user should be assigned to the group based on the user's specific vector $N_i$ may be computed using equation [3] below:

$$p(\text{user}=i|\text{group}=k)=(Z_i^k)/\Sigma_i(Z_i^k)$$

$$\text{where,} Z_i^k=(N_i^k)/\Sigma_k(N_i^k) \quad [3]$$

The probability computed using equation [3] may be useful when determining which users are good candidates to include in a particular group.

Example Process for Distributed Clustering

Figure 3:
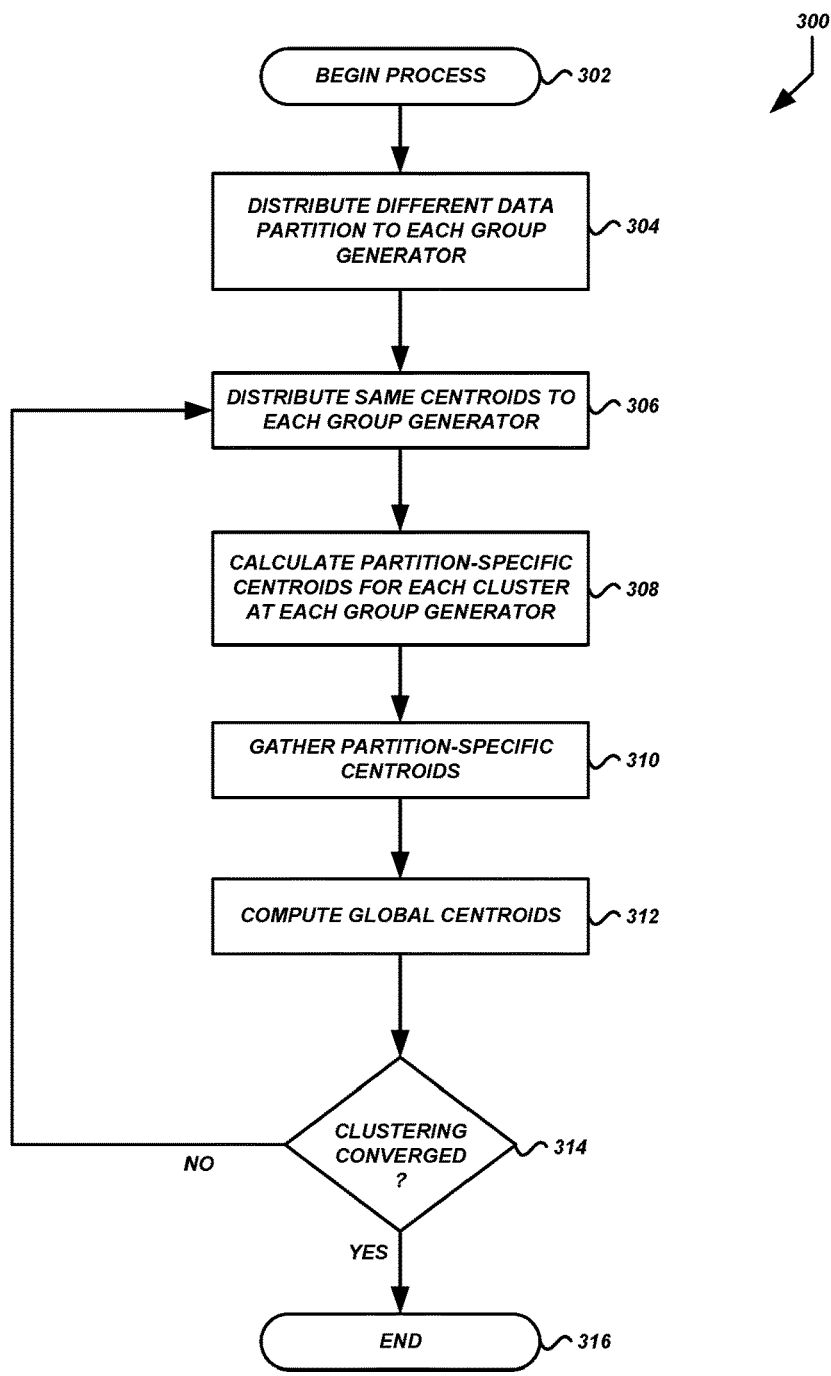
FIG. 3 is a flow diagram of an illustrative process for distributing the grouping of items and users across multiple processors according to some embodiments.

FIG. 3 is a flow diagram of an illustrative process 300 that may be executed by multiple group generators 112 or some other modules or components of a content management system 100 to cluster items in a distributed manner. Advantageously, the process 300 includes the partitioning of the data to be clustered (e.g., the item-specific vectors) among multiple different processors to allow the data to be clustered in parallel, thus reducing the overall time required to perform clustering and mitigating the memory constraints that may impact clustering on a single processor. The process 300 will be described with reference to the illustrative data flows and interactions shown in FIG. 4, and the illustrative compact data structure shown in FIG. 5.

The process 300 shown in FIG. 3 begins at block 302. The process 300 may begin in response to an event, such as when execution of a content generator 112 begins, when initiated by a system administrator, etc. When the process 300 is initiated, a set of executable program instructions stored on one or more non-transitory computer-readable media (e.g., hard drive, flash memory, removable media, etc.) may be loaded into memory (e.g., random access memory or "RAM") of one or more computing devices of the content management system 100. The executable instructions, or portions thereof, may then be executed by multiple hardware-based computer processors (e.g., central processing units or "CPUs") of the computing device. Some portions of the process 300 may be performed in parallel, while other portions of the process 300 may be performed serially, as described in greater detail below.

At block 304, a group generator 112 or some other module or component of the content management system 100 can separate the data to be clustered into multiple partitions, and distribute the partitions among the group generators 112 that will participate in the distributed cluster. For example, if there are 100,000 different vectors to be processed by 10 different group generators 112, then 10 different partitions of 10,000 vectors each may be generated and transmitted to the individual group generators. Illustratively, each of the group generators 112 may correspond to a separate physical computing device, such as a server computing device with its own processor and memory. In some embodiments, two or more group generates may correspond to separate processors within a single computing device, such separate CPUs.

Figure 4:
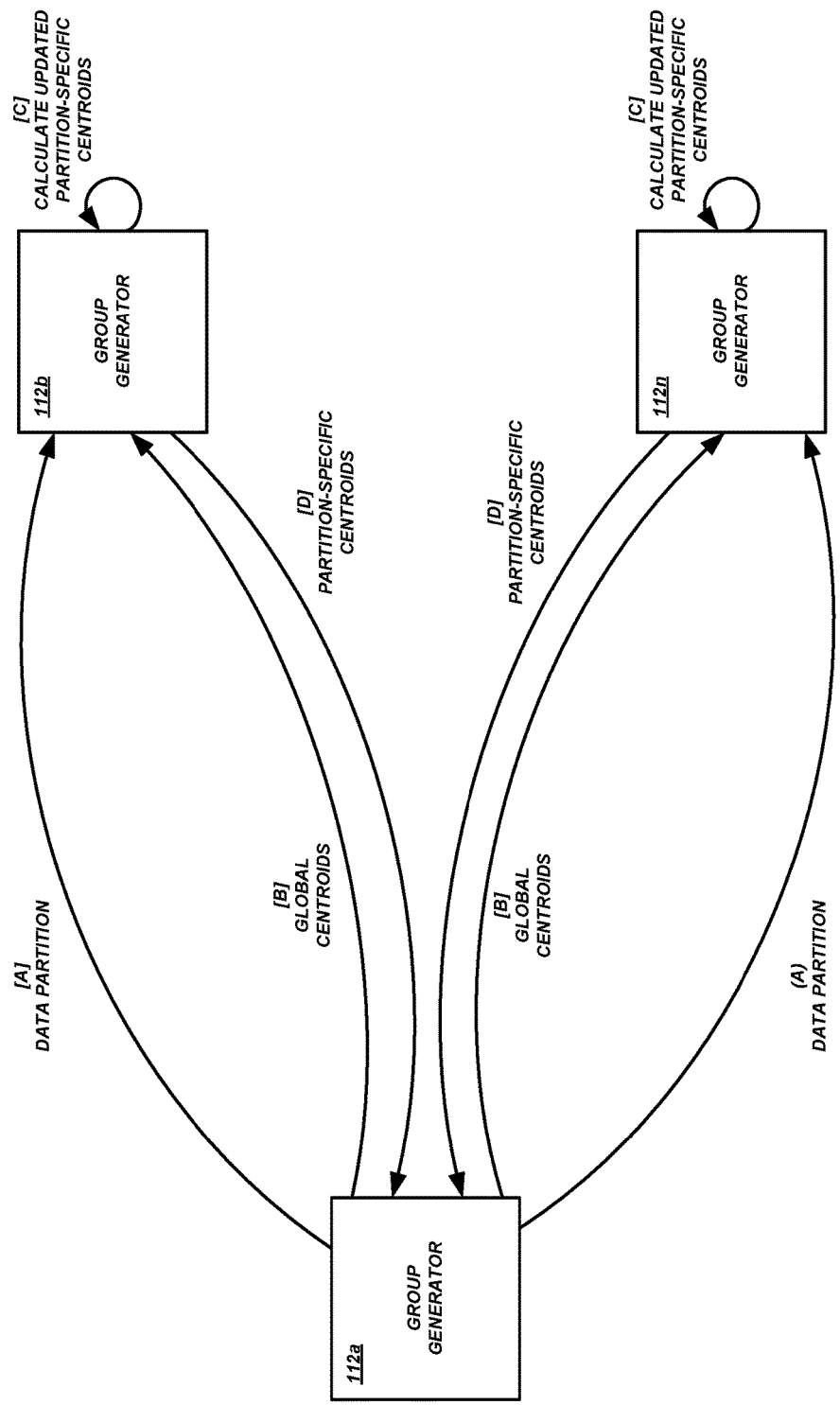
FIG. 4 is a block diagram of illustrative interactions and data flows between multiple processors during the distributed grouping of items and users according to some embodiments.

FIG. 4 shows example data flows and interactions that occur between multiple group generators 112a-112n during distributed clustering. As shown at [A], a particular group generator 112a can provide different partitions of data to each of the other group generators 112b to 112n participating the distributed clustering.

Returning to FIG. 3, at block 306 a group generator 112 or some other module or component of the content management system 100 can distribute an initial set of centroids for the clusters to each of the other group generators 112 that will participate in the distributed clustering. For example, as shown in FIG. 4 at [B], group generator 112a may provide the same set of centroids to each of the group generators 112b-112n at the start of each iteration of clustering. This distribution is performed so that the different group generators 112 begin from the same starting point when clustering vectors in the group generators' respective partitions.

At block 308, the individual group generators 112 or other modules or components of the content management system 100 can each calculate updated cluster centroids using a different partition of the cluster data, as shown in FIG. 4 at [C]. For example, the individual group generators 112a-112n can compute the cosine difference between a particular vector and each of the cluster centroids, and add the vector to closest cluster, as described above with respect to FIG. 2. The group generators 112a-112n can repeat these operations for each vector in the group generators' respective data partitions.

In some embodiments, to reduce the amount of memory required to cluster the vectors, a compact probabilistic data structure such as a "count sketch" may be used to store information regarding the vectors in each cluster. A count sketch is a data structure that generally serves as a frequency table of events in a stream of data. Hash functions are used to map events to individual data points in the count sketch, and the individual data points are used to track the frequencies of the mapped events. Applied to the clustering process 300, the events tracked by a count sketch may correspond to user interactions with content regarding a particular item. For example, a separate count sketch may be generated for each cluster on each group generator 112a-112n. The count sketch for each cluster can represent the centroid of the cluster. When a data vector is to be compared to the centroid from each cluster, a temporary count sketch may be generated for the data vector, and the comparison metrics (e.g., cosine distances) can be computed using the temporary vector-specific count sketch and the count sketches for each cluster centroid. When a vector is added to a particular cluster, the user interactions represented by the vector are added to the cluster's count sketch (e.g., the cluster's count sketch is modified to represent the centroid of the cluster with the addition of the current data vector), rather than adding the entire vector to an array of vectors in the cluster. The temporary count sketch for the data vector may not be stored, but may instead be discarded or overwritten by a temporary count sketch for a next data vector.

Figure 5:
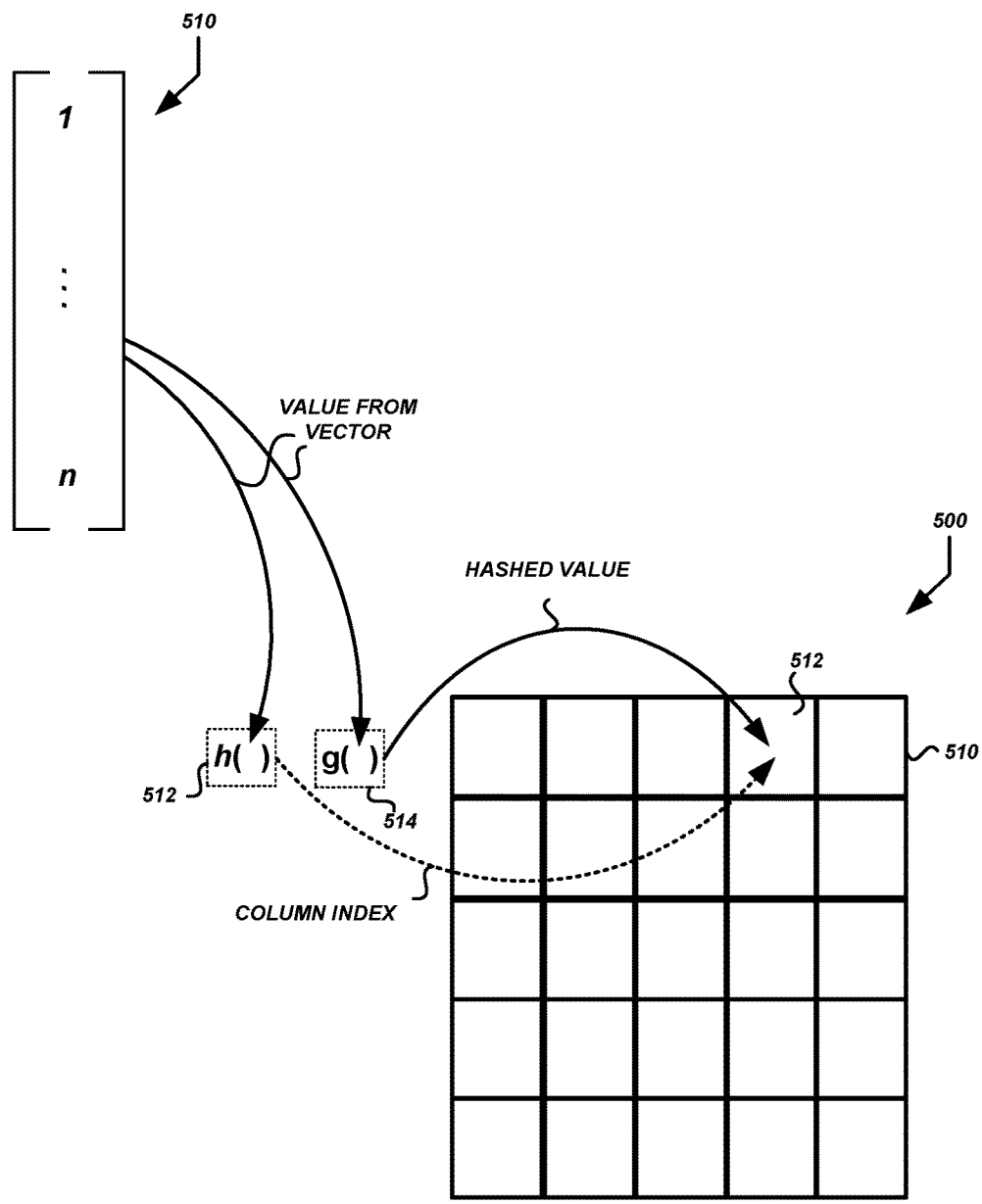
FIG. 5 is a block diagram of an illustrative probabilistic data structure used to reduce the amount of data that is processed during the distributed grouping of items and users according to some embodiments.

FIG. 5 shows an example of a vector 502 being added to a count sketch 500. As shown, the count sketch 500 is a two dimensional m×w array. Input values can be added to the count sketch 500 at each of the m rows. For example, the vector 502 includes n dimensions, corresponding to the n users whose interactions with content regarding a particular item are represented by the n different values. To add the vector 502 to the count sketch 500 for a particular cluster, each of the n different values of the vector 502 are added to potentially different locations within each of the m different rows of the count sketch 500. This may cause "collisions" at one or more of the rows, when a value from another vector or subset of vectors has already been added at the same location(s) within the row(s). However, because the vectors 502 are typically quite sparse and the n values are added to each of the m rows, at least some of the locations to which any particular value is added is likely to be free or substantially free of collisions with other large values. Thus, by redundantly storing the n values for each vector in each of the m rows, a dense count sketch 500 can be used to represent the cluster within a reasonable degree of accuracy, instead of using a much larger collection of sparse vectors.

To determine how the input values are to be added to the count sketch 500, a set of m pairs of hash functions h( ) and g( ) can be defined, with one pair of hash functions for each of the m rows. The first hash function h( ) of each pair maps the input value to one of the w columns in the current row. The second hash function g( ) of each pair maps the same input value to a particular value that is added or otherwise applied to the count sketch at current column/row intersection that was determined using the first hash function h( ). Illustratively, for a particular row 510, the second hash function go 514 may convert each input value to one of the set (−1, 1), which is added to the value stored at the current column/row intersection 516 that was determined using the first hash function h( ) 512. In some embodiments, the second hash function go 514 may use different mappings (e.g., to any value on a continuous interval from −1 to 1, to either 0 or 1, or to some other discrete or continuous set of possible values). In some embodiments, the input value may simply be added to the count sketch 500 at the current row/column intersection 516 without using a second hash function, or the value at the current row/column intersection 516 may simply be incremented by 1 if the input value is >=1. The example values and methods of applying values to the count sketch described herein are illustrative only, and are not intended to be limiting. In some embodiments, other values and/or methods of applying the values may be used. In some embodiments, the size of the count sketch 500 (e.g., the number of rows m and the number of columns w in an m×w sketch) may be chosen to minimize the size of the count sketch 500 while maintaining an acceptable error rate.

At block 310, the individual group generators 112 or other modules or components of the content management system 100 can provide their partition-specific cluster centroids to a single group generator 112, as shown in FIG. 4 at [D]. For example, group generators 112b-112n can provide their cluster-specific count sketches to group generator 112a, along with counts of how many vectors have been assigned to each cluster. As another example, the group generators 112b-112n may compute cluster centroids from the count sketches and provide the centroids to the group generator 112a, along with counts of how many vectors have been assigned to each cluster. In either case, the counts of vectors in each cluster can be used to compute a weighted mean of the centroids for each cluster. A weighted mean may be more representative of the true overall centroid than a simple mean of centroids because each group generator 112a-112n may have assigned a different number of vectors to each cluster.

At block 312, the group generator 112a or some other module or component of the content management system 100 that received the separate partition-specific cluster centroids above can compute global centroids over all partitions.

At decision block 314, the group generator 112a or other module or component of the content management system 100 that computed the global centroids can determine whether clustering has been completed (also referred to as "converged"). The determination may be based on any of a number of different factors, including: whether any items have been re-assigned to a new cluster during the latest iteration; whether a threshold number of items have been re-assigned to new clusters during the latest iteration; whether the centroids (or some subset thereof) have been modified by at least a threshold amount during the latest iteration, or some other criteria; whether the total number of iterations satisfies some predetermined or dynamically determined threshold; whether the total computational costs of all iterations satisfies some predetermined or dynamically determined threshold; whether the computational cost of performing another iteration justifies the expected benefits of another iteration, etc. If clustering has not yet completed, the process 300 may return to block 306. Otherwise, if clustering has completed, then the process 300 may terminate at block 316.

Example Process for Assigning Objects to Groups Using Seed Expansion

Figure 6:
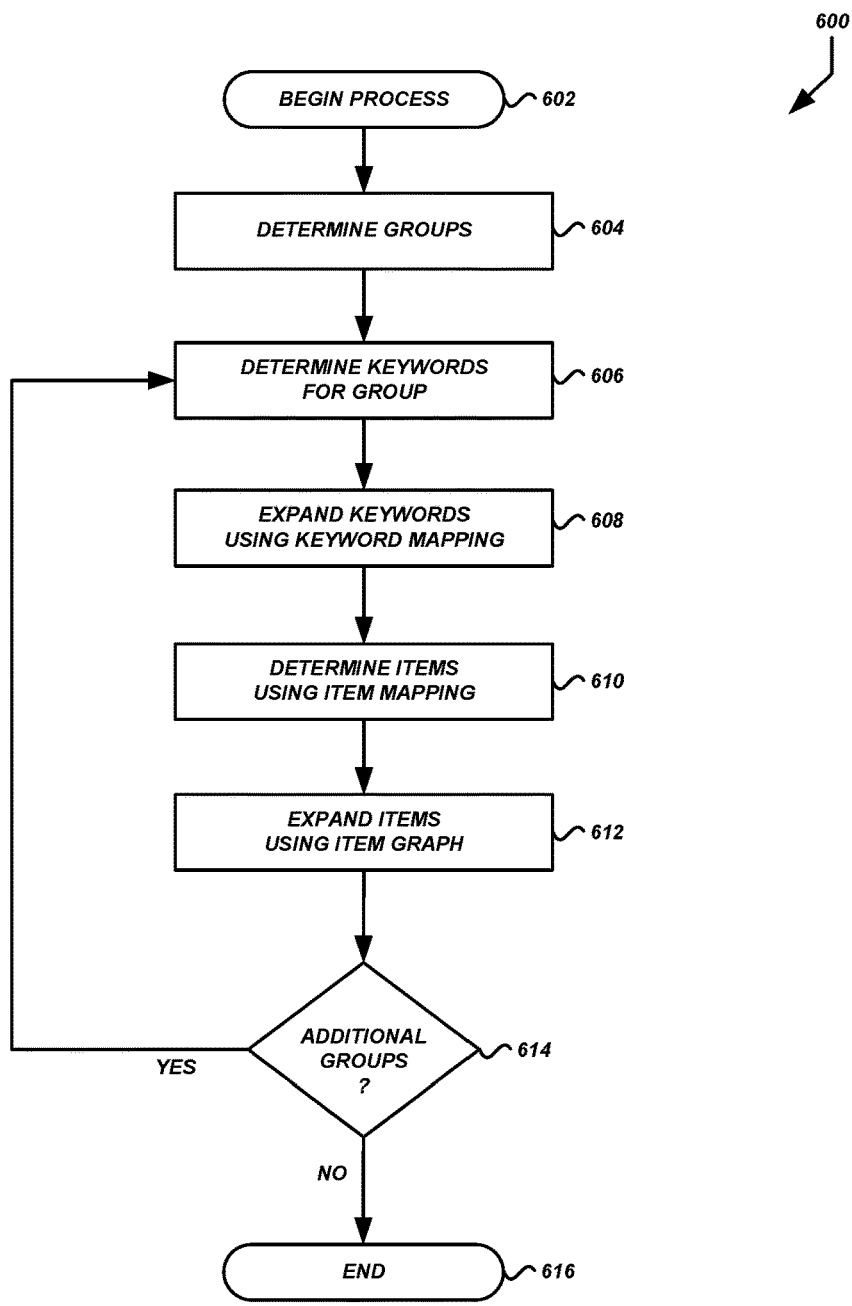
FIG. 6 is a flow diagram of an illustrative process for determining additional items for item groups according to some embodiments.

FIG. 6 is a flow diagram of an illustrative process 600 that may be executed by a group generator 112 or some other module or component of the content management system 100 to expand the volume of objects (e.g., items, users) assigned to predetermined groups. Advantageously, the process 600 may leverage similarities in users' search queries and content browsing sessions. Portions of the process 600 will be described with reference to FIGS. 7 and 8, which show an example of using an item graph to identify similar items for grouping.

The process 600 shown in FIG. 6 begins at block 602. The process 600 may begin in response to an event, such as when execution of a content generator 112 begins, when initiated by a system administrator, etc. When the process 600 is initiated, a set of executable program instructions stored on one or more non-transitory computer-readable media (e.g., hard drive, flash memory, removable media, etc.) may be loaded into memory (e.g., random access memory or "RAM") of a computing device of the content management system 100. The executable instructions may then be executed by a hardware-based computer processor (e.g., a central processing unit or "CPU") of the computing device. In some embodiments, the process 600 or portions thereof may be implemented on multiple processors, serially or in parallel.

At block 604, a group generator 112 or some other module or component of the content management system 100 can determine a starting set of groups. In some embodiments, a set of high-level categories may have already been defined, or an operator of the content management system 100 may have a set of groups that is to serve as the basis for group expansion. For example, the starting set of groups may include categories such as babies, photography, sports, home improvement, and the like. The content management system 100 can use the process 600 to expand these broad groups into sets of keywords that can be used to identify items to be added to the groups.

At block 606, the group generator 112 or some other module or component of the content management system 100 can determine keywords for a particular group of the starting set of groups. Returning the example above, the broad groups may be associated with textual descriptions that can serve as the initial keywords for the groups. For example, the group for "home improvement" may be associated with a textual description that specifies that the group includes tools, fixtures, and storage solutions. The words in this textual description can be used as a keyword starting point from which to expand the keywords and thus the overall coverage of the "home improvement" group.

At block 608, the group generator 112 or some other module or component of the content management system 100 can use a map of keywords in user search queries to expand the keywords associated with the current group. Based on the assumption that users typically search for similar items within the same session, the content management system 100 may maintain a data set that maps keywords to other keywords that are determined to be related by virtue of being used in search queries within the same session. This keyword mapping data set, stored in the keyword mapping data store 128, may be based on the aggregated number of times that pairs or sets of keywords are used in search queries within the same session. For example, keyword pairs that are used at least a threshold number of times in the same session may be determined to be related, and may be mapped to each other within the keyword mapping data set. Returning to the example above, when submitting searches related to "tools," users may often submit search queries in the same session for power tools, hand tools, garden tools, saws, hammers, shovels, woodworking books, home improvement manuals, etc. The keyword mapping data set maintained by the content management system 100 may map the keyword "tools" to these example keywords. The group generator 112, when processing the "home improvement" group to add items and expand coverage of the group, may add some or all of the keywords mapped to "tools" in the keyword mapping data store 128 to the list of keywords used below. In some embodiments, data regarding a topic of some keywords may be analyzed, and additional keywords may be extracted. For example, external data sources such as network-based dictionaries, encyclopedias, articles, books, product descriptions, etc.) may be analyzed, and words or word combinations (e.g., n-grams, such as bigrams) may be extracted. Illustratively, if a "sustainable living" keyword was used to obtain data from an external data source, bigrams such as "photovoltaic cells," "organic gardening", specific author names, and the like may be observed in the obtained data. Based on statistical characteristics of the words or word combinations (e.g., the log likelihood ratio computed for extracted bigrams), additional keywords may be mapped to the original "sustainable living" keyword.

At block 610, the group generator 112 or some other module or component of the content management system 100 can use a can use a map of keywords to items when determining which items to add to the current group. Based on the assumption that the items that users purchase (or interact with in other ways) are related to the search queries submitted close in time to the interactions, the content management system 100 may maintain a data set that maps keywords to items. The keyword-to-item mapping data set, stored in the item mapping data store 130, may be based on the aggregated number of times individual items are purchased (or interacted with in other ways) after search queries with particular keywords are submitted. For example, items that are purchased at least a threshold number or percentage of times after a keyword is submitted in a search query may be determined to be related to the keyword, and may be mapped to the keyword within the item mapping data set. Returning to the example above, users may often purchase particular saws, hammers, shovels, woodworking books, and the like after submitting search queries with the keywords "power tools," "hand tools," "garden tools," and "home improvement." The item mapping data set maintained by the content management system 100 may therefore map the keywords "power tools," "hand tools," "garden tools," and "home improvement" to the items saws, hammers, shovels, and woodworking books. The group generator 112, when processing the "home improvement" group to add items and expand coverage of the group, may add some or all of the items mapped to the keywords "power tools," "hand tools," "garden tools," and "home improvement" in the item mapping data store 130.

At block 612, the group generator 112 or some other module or component of the content management system 100 can use graphs related items to expand the items assigned to the current group. Based on the assumption that individual users tend to browse content related to similar items and/or purchase similar items, the content management system 100 may generate a graph of related items. A pair of items in the graph may be connected if they are determined to be related (e.g., based on the aggregated number of times that both items have been purchased by the same user overall or in the same session, based on the aggregated number of times content regarding both items has been viewed by the same user during the same session, etc.). For example, pairs of items that are purchased at least a threshold number of times in the same session may be determined to be related, and may be connected in an item graph.

Figure 7:
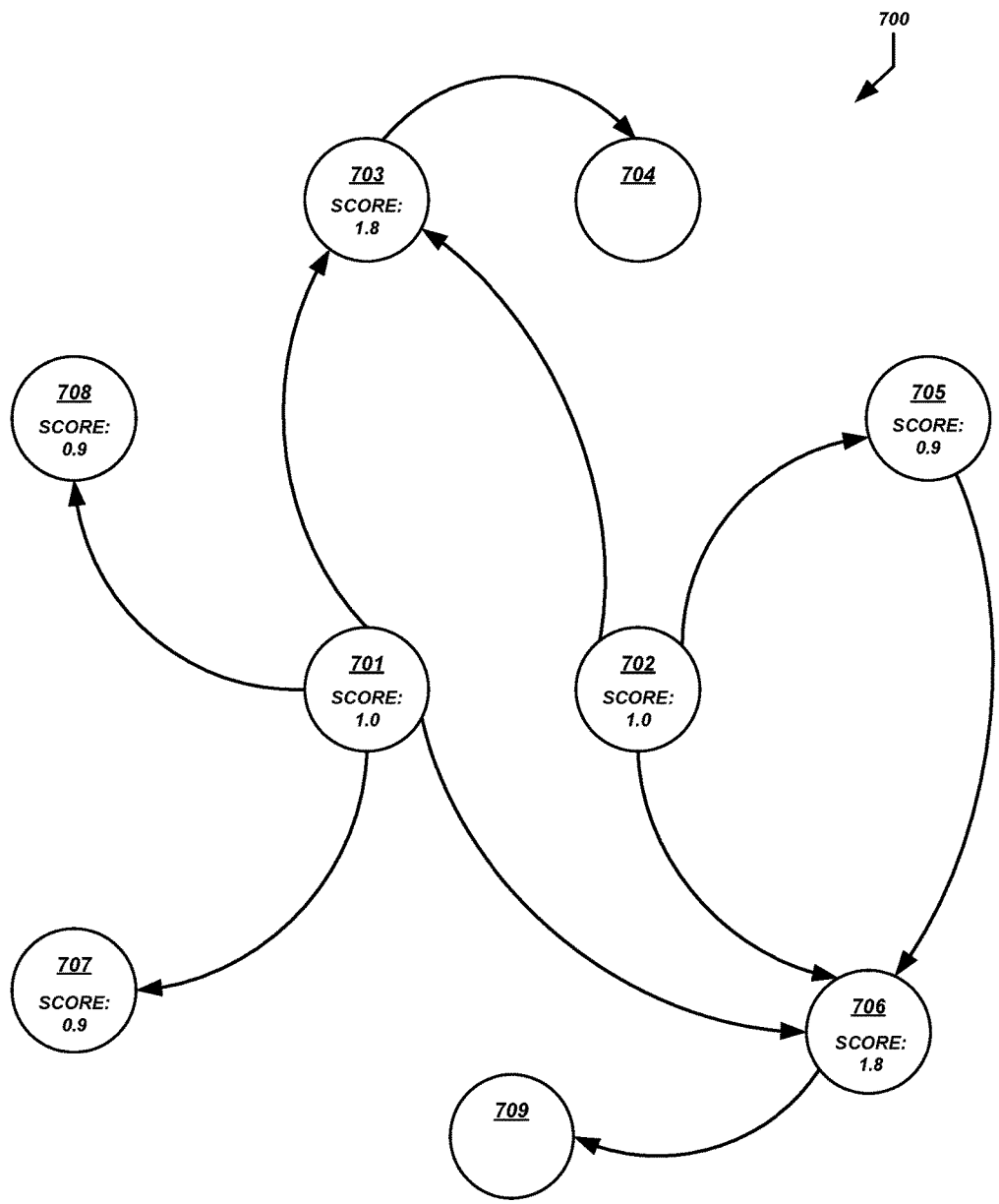
FIGS. 7 and 8 are conceptual diagrams of illustrative connections between items according to some embodiments.
Figure 8:
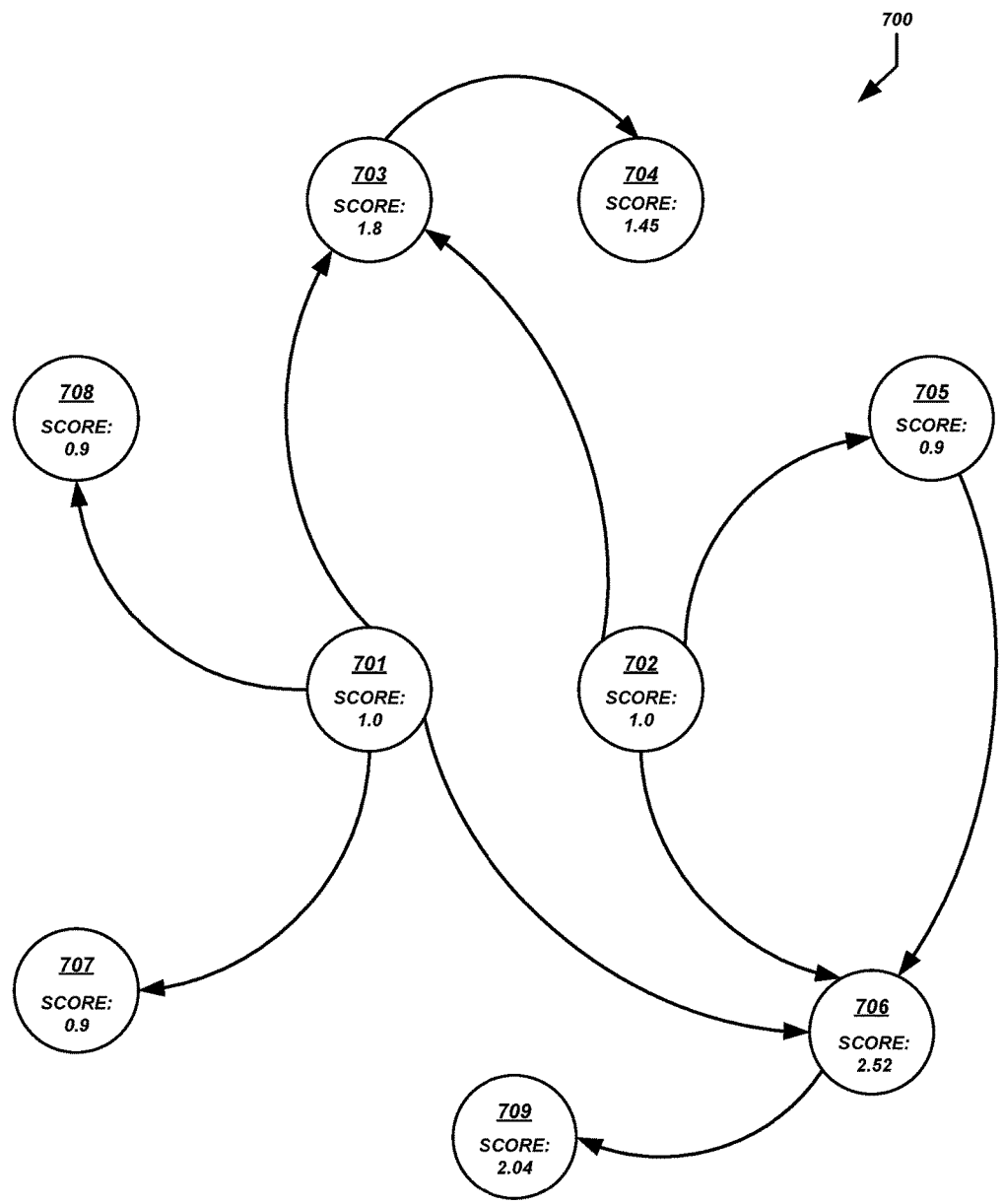

FIGS. 7 and 8 illustrate an example item graph 700, showing connections between items that have been determined to be related. The graph 700 can be used to expand the number of items assigned to a group by choosing items already assigned to the group to be "seed" items. Items closely related the seed items may then be determined using the graph 700 and added to the group. In the graph 700 shown in FIGS. 7 and 8, nodes 701 and 702 represent the seed items. For example, the nodes may be particular tools, such as a particular saw and a particular hammer that have already been added to the "home improvement" group. Other nodes 703, 704, 705, 706, 707, 708, and 709 are related to the seed nodes 701 and 702 and to each other in various pairings, as indicated by the connections shown. In some embodiments, the graph 700 may be generated by analyzing the aggregate browsing session data of users (e.g., item-related content viewed in a single session) and discovering which items tend to be viewed together (e.g., item-related content pages regarding two or more different items are viewed in a single browsing session a threshold number of times or a threshold percentage of the time). For example, the analysis may be performed using an item-to-item collaborative filtering algorithm that discovers clusters of items that are viewed together in a session. A graph can be generated with nodes corresponding to items, and with edges corresponding to weights or similarity scores that connect two items. Illustratively, the graph may be a unidirectional graph indicating the order in which item-specific content tends to be viewed (e.g., the root node may represent item-specific content that tends to be viewed early in a browsing session, a second level node may represent item-specific content that tends to be viewed after content represented by the root node, etc.). A similar graph may be generated using the "reverse" edges. For example, the root node may represent item-specific content that tends to be viewed after item-specific content represented by a second-level node, and so on. Both graphs ("forward" and "reverse") can be traversed to expand the number of items assigned to a group, as described in greater detail below. In some embodiments, a filtering technique may be used in which popular query terms for items are cross-referenced with keywords associated with the current group. Illustratively, the most popular query terms may be obtained from a data set of user browsing session interactions (e.g., data regarding the user's "clickstream" and other content interactions).

Scores may be assigned to the items represented by the nodes in the graph 700 using an iterative process to determine which items to add to the group. In some embodiments, the nodes 701, 702 corresponding to the seed items may be assigned an initial score, such as 1.0. In a first iteration, nodes that are directly connected to the seed nodes 701, 702 (e.g., nodes connected to a seed node without any intervening node) may be assigned a weighted or decayed score based on the score of the seed node(s) to which they are connected. The nodes that are directly connected to one or more seed nodes may be referred to as first level nodes. In the example shown in FIG. 7, a decay factor or weighting factor of 0.9 has been applied to the seed node scores 1.0 to get a weighted score of 0.9 for all first level nodes 705, 706, 707, and 708 that are directly connected to only one seed node 701, 702. If a first level node is connected to multiple seed nodes, as the nodes 703 and 706 are, those nodes may be assigned the sum of weighted scores for each of seed nodes to which they are connected. In this example, nodes 703 and 706 would be assigned a score of 1.8 each (1.0*0.9+ 1.0*0.9).

In the next iteration of the scoring process, all nodes (other than seed nodes) that are directly connected to a first level node may be assigned a weighted score based on the score of the first level node(s) to which they are connected. The nodes that are directly connected to one or more first level nodes may be referred to as second level nodes. The weighting factor applied to first-level node scores when determining the second-level node scores may be an exponential decay of the factor applied to the seed node scores when determining the first-level node scores (e.g., the weighting factor for second level node scores may be $0.9^2=0.81$). In the example shown in FIG. 8, a weighting factor of 0.81 has been applied to the first level node scores from FIG. 7 to get a weighted score for each of the second level nodes. Because node 706 is a both a first level node (directly connected to seed nodes 703 and 702) and a second level node (directly connected to first level node 705), the score for node 706 is increased again by the weighted score of node 705. This addition to the score is appropriate because the node 706 is well-connected and its relevance is reinforced by the additional connections.

The scoring of the graph 700 may continue until all nodes directly or indirectly connected to the seed nodes have been scored. The group generator 112 can then select the highest-scoring items represented in the graph 100 that are not already in the current group, and add those items to the group.

At decision block 614, the group generator 112 or some other module or component of the content management system 100 can determine whether there are additional groups to be processed. If so, the process 600 can return to block 606. Otherwise, if processing of all groups has been completed, the process 600 can terminate at block 616.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
    a first computing device, wherein the first computing device comprises a processor programmed by executable instructions to at least:
        determine a first cosine distance between a first data vector, represented by a first temporary probabilistic data structure, and a center of a first cluster of data vectors;
        determine a second cosine distance between the first data vector, represented by the first temporary probabilistic data structure, and a center of a second cluster of data vectors;
        determine that the first cosine distance is smaller than the second cosine distance;
        modify a first probabilistic data structure using the first data vector, wherein the first probabilistic data structure comprises data, regarding the first cluster of data vectors, from which the center of the first cluster of data vectors is determined; and
        transmit the first probabilistic data structure to a second computing device; and
    the second computing device, wherein the second computing device comprises a processor programmed by executable instructions to at least:
        determine a third cosine distance between a second data vector, represented by a second temporary probabilistic data structure, and the center of the first cluster of data vectors;
        determine a fourth cosine distance between the second data vector, represented by the second temporary probabilistic data structure, and the center of the second cluster of data vectors;
        determine that the third cosine distance is smaller than the fourth cosine distance;
        modify a second probabilistic data structure using the second data vector, wherein the second probabilistic data structure comprises data, regarding the first cluster of data vectors, from which the center of the first cluster of data vectors is determined;
        receive the first probabilistic data structure from the first computing device; and
        generate a third probabilistic data structure using the first probabilistic data structure and the second probabilistic data structure, wherein the third probabilistic data structure comprises data, regarding the first cluster of data vectors, from which an updated center of the first cluster of data vectors is determined.

2. The system of claim 1, wherein the first probabilistic data structure comprises a count sketch, and wherein the count sketch is received by the first computing device from the second computing device prior to the first computing device determining the first cosine distance.

3. The system of claim 1, wherein the first data vector comprises a plurality of dimensions, wherein a first dimension of the plurality of dimensions comprises data regarding interactions of a first user with content regarding an item, and wherein a second dimension of the plurality of dimensions comprises data regarding interactions of a second user with content regarding the item.

4. The system of claim 1, wherein the executable instructions that program the first computing device to determine the first cosine distance comprise instructions to at least:
    compute a first product using (1) a first dimension value of the first data vector and (2) a first corresponding value of data regarding the center of the first cluster of data vectors;
    compute a second product using (3) a second dimension value of the first data vector and (4) a second corresponding value of the data regarding the center of the first cluster of data vectors; and
    subtract a sum of the first product and the second product from a constant value.

5. A computer-implemented method comprising:
    as performed by a first computing system configured to execute specific instructions,
        determining a cosine distance between a data vector and a representation of a center of a first data vector group;
        determining, based at least partly on the cosine distance, to add the data vector to the first data vector group instead of a second data vector group;
        modifying a plurality of values of a first probabilistic data structure using the data vector, wherein the first probabilistic data structure comprises data, regarding the first data vector group, from which the representation of the center of the first data vector group is determined;
        transmitting the first probabilistic data structure to a second computing system; and
        receiving, from the second computing system, a second probabilistic data structure, wherein the second probabilistic data structure comprises data regarding the first data vector group, and wherein the second probabilistic data structure is based at least partly on data from the first probabilistic data structure.

6. The computer-implemented method of claim 5, wherein the first probabilistic data structure comprises a first count sketch, wherein the second probabilistic data structure comprises a second count sketch generated by the second computing system using a plurality of count sketches, and wherein the plurality of count sketches includes the first count sketch.

7. The computer-implemented method of claim 5, wherein the second probabilistic data structure comprises a weighted average of a plurality of probabilistic data structures, the plurality of probability data structures including the first probabilistic data structure.

8. The computer-implemented method of claim 5, wherein modifying the plurality of values comprises:
  determining a value of a hash function using a first dimension value of the data vector; and
  adding the value of the hash function to a value of the plurality of values.

9. The computer-implemented method of claim 5, wherein determining the cosine distance comprises:
  computing a first product using (1) a first dimension value of the data vector and (2) a first corresponding value of the representation of the center of the first data vector group;
  computing a second product using (3) a second dimension value of the data vector and (4) a second corresponding value of the representation of the center of the first data vector group; and
  summing the first product and the second product.

10. The computer-implemented method of claim 5, further comprising:
  determining a second representation of the center of the first data vector group using the second probabilistic data structure;
  determining a second cosine distance between the data vector and the second representation of the center of the first data vector group;
  determining, based at least partly on the second cosine distance, to add the data vector to the second data vector group instead of the first data vector group;
  modifying a plurality of values of a third probabilistic data structure using the data vector, wherein the third probabilistic data structure comprises data regarding the second data vector group.

11. The computer-implemented method of claim 5, wherein the data vector comprises a plurality of dimensions, wherein a first dimension of the plurality of dimensions comprises data regarding interactions of a first user with content regarding an item, and wherein a second dimension of the plurality of dimensions comprises data regarding interactions of a second user with content regarding the item.

12. The computer-implemented method of claim 5, wherein a first dimension of the data vector comprises data regarding an attribute of an item.

13. A non-transitory computer storage medium storing an executable module, wherein the executable module configures a first computing system to perform a process comprising:
  determining, based at least partly on a distance between a data vector and a representation of a center of a first data vector group, to add the data vector to the first data vector group instead of a second data vector group;
  modifying a value of a first probabilistic data structure using the data vector, wherein the first probabilistic data structure comprises data, regarding the first data vector group, from which the representation of the center of the first data vector group is determined;
  transmitting the first probabilistic data structure to a second computing system; and
  receiving, from the second computing system, a second probabilistic data structure, wherein the second probabilistic data structure comprises data regarding the first data vector group, and wherein the second probabilistic data structure is based at least partly on data from the first probabilistic data structure.

14. The non-transitory computer storage medium of claim 13, wherein the first probabilistic data structure comprises a first count sketch, wherein the second probabilistic data structure comprises a second count sketch generated by the second computing system using a plurality of count sketches, and wherein the plurality of count sketches includes the first count sketch.

15. The non-transitory computer storage medium of claim 13, wherein the second probabilistic data structure comprises a weighted average of a plurality of probabilistic data structures, the plurality of probability data structures including the first probabilistic data structure.

16. The non-transitory computer storage medium of claim 13, wherein modifying the value comprises:
  determining a value of a hash function using a first dimension value of the data vector; and
  adding the value of the hash function to a value of the plurality of values.

17. The non-transitory computer storage medium of claim 13, the process further comprising:
  computing a first product using (1) a first dimension value of the data vector and (2) a first corresponding value of the representation of the center of the first data vector group; and
  computing a second product using (3) a second dimension value of the data vector and (4) a second corresponding value of the representation of the center of the first data vector group;
  computing a sum of the first product and the second product, wherein the distance between the first vector and the representation of the center of the first data vector group is based at least partly on the sum.

18. The non-transitory computer storage medium of claim 13, the process further comprising:
  determining a second representation of the center of the first data vector group using the second probabilistic data structure;
  determining, based at least partly on a second distance between the data vector and the second representation of the center of the first data vector group, to add the data vector to the second data vector group instead of the first data vector group;
  modifying a value of a third probabilistic data structure using the data vector, wherein the third probabilistic data structure comprises data regarding the second data vector group.

19. The non-transitory computer storage medium of claim 13, wherein the data vector comprises a plurality of dimensions, wherein a first dimension of the plurality of dimensions comprises data regarding interactions of a first user with content regarding an item, and wherein a second dimension of the plurality of dimensions comprises data regarding interactions of a second user with content regarding the item.

20. The non-transitory computer storage medium of claim 13, the process further comprising receiving a plurality of data vectors from the second computing system, wherein the plurality of data vectors comprises the data vector.

* * * * *

UNITED STATES PATENT AND TRADEMARK OFFICE
CERTIFICATE OF CORRECTION

PATENT NO. : 10,394,913 B1
APPLICATION NO. : 15/210841
DATED : August 27, 2019
INVENTOR(S) : Vineet Shashikant Chaoji It is certified that error appears in the above-identified patent and that said Letters Patent is hereby corrected as shown below:

In the Specification

In Column 12, Line 66, delete "go" and insert --g( )--.

In Column 13, Line 3, delete "go" and insert --g( )--.

Signed and Sealed this
Twenty-sixth Day of November, 2019

Andrei Iancu
*Director of the United States Patent and Trademark Office*